United States Patent
Duncan et al.

(10) Patent No.: US 9,278,636 B2
(45) Date of Patent: Mar. 8, 2016

(54) FIXED THIGH EXTENDER TRIM CLOSEOUT

(71) Applicant: LEAR CORPORATION, Southfield, MI (US)

(72) Inventors: Bradley C. Duncan, Harrison Township, MI (US); Benedict J. Messina, Warren, MI (US)

(73) Assignee: Lear Corporation, Southfield, MI (US)

( * ) Notice: Subject to any disclaimer, the term of this patent is extended or adjusted under 35 U.S.C. 154(b) by 188 days.

(21) Appl. No.: 14/018,984

(22) Filed: Sep. 5, 2013

(65) Prior Publication Data

US 2015/0061343 A1    Mar. 5, 2015

(51) Int. Cl.
*B60N 2/62*     (2006.01)

(52) U.S. Cl.
CPC ........................................ *B60N 2/62* (2013.01)

(58) Field of Classification Search
CPC .......................................................... B60N 2/62
USPC ..................................................... 297/284.11
See application file for complete search history.

(56) References Cited

U.S. PATENT DOCUMENTS

| | | | |
|---|---|---|---|
| 7,571,964 B2 * | 8/2009 | Taniguchi et al. | 297/284.11 |
| 9,039,085 B2 * | 5/2015 | Aselage | 297/284.11 X |
| 2007/0108817 A1 | 5/2007 | Lee et al. | |
| 2008/0157577 A1 * | 7/2008 | Lindsay | 297/284.11 X |
| 2009/0174242 A1 * | 7/2009 | Kohl et al. | 297/284.11 |
| 2009/0212611 A1 | 8/2009 | Gloriosa | |
| 2010/0109401 A1 * | 5/2010 | Booth et al. | 297/284.11 |
| 2011/0260506 A1 | 10/2011 | Kuno | |

FOREIGN PATENT DOCUMENTS

FR       2931742 A1 * 12/2009 ............... B60N 2/62

* cited by examiner

*Primary Examiner* — Anthony D Barfield

(74) *Attorney, Agent, or Firm* — Brooks Kushman P.C.

(57) ABSTRACT

A vehicle seat includes a seat back, a seat bottom, and a thigh extender assembly. The thigh extender assembly includes an extension bracket assembly attached to the seat bottom, a thigh support attached to an end of the extension bracket such that the thigh support is moveable between a retracted position and an extended position, and a trim cover assembly disposed over the extension bracket assembly. The extension bracket assembly includes a seat bracket and an extension bracket with the extension bracket being moveable relative to the seat bracket such that when the thigh support moves between the retracted position and the extended position the extension bracket is concealed. The trim cover assembly is held fixed with respect to the seat bracket with the thigh support moving relative to the trim cover assembly.

16 Claims, 5 Drawing Sheets

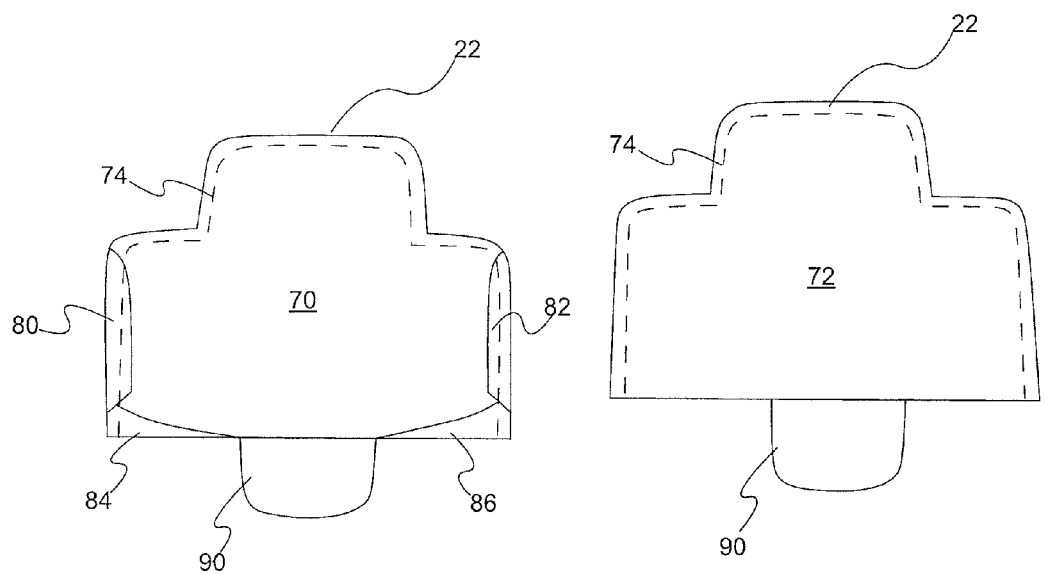
Fig. 5A
Fig. 5B
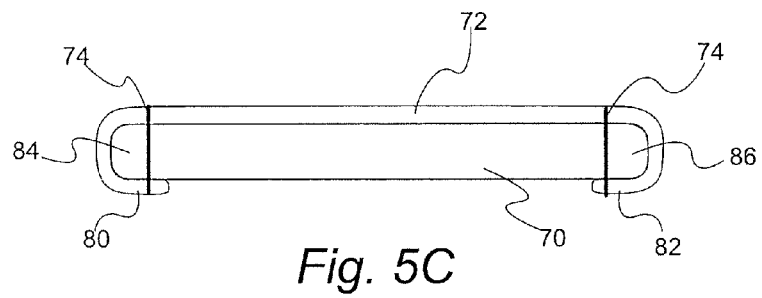
Fig. 5C

FIXED THIGH EXTENDER TRIM CLOSEOUT

TECHNICAL FIELD

The present disclosure relates to a vehicle seat assembly, and in particular, a seat assembly including a thigh extender.

BACKGROUND

Automobile manufacturers and suppliers constantly strive to improve the aesthetic appeal of vehicle interior components. Such considerations have influenced the design of vehicle interior trim, seat, and console components to name a few.

Some vehicle seat designs include an extendable thigh extender for the comfort of the passengers. Typically, the thigh extender is mounted on a moveable bracket which, if not covered, would be undesirably visible. In at least one prior art design, the moveable bracket is covered with a cover including a plurality of folds which open and close in an accordion-like manner. Although such designs work well, the fabrication of such covers involves additional manufacturing steps adding to the cost of the vehicle seat.

Accordingly, there is a need for improved vehicle seat thigh extenders in which the moveable bracket is covered in an aesthetically acceptable manner.

SUMMARY

The present invention solves one or more problems of the prior art by providing, in at least one embodiment, a vehicle seat having an aesthetically pleasing thigh extender. The vehicle seat includes a seat back, a seat bottom, and a thigh extender assembly. The thigh extender assembly includes an extension bracket assembly attached to the seat bottom, a thigh support attached to an end of the extension bracket such that the thigh support is moveable between a retracted position and an extended position, and a trim cover assembly disposed over the extension bracket assembly. The extension bracket assembly includes a seat bracket and an extension bracket with the extension bracket being moveable relative to the seat bracket such that when the thigh support moves between the refracted position and the extended position the extension bracket is concealed. The trim cover assembly is held fixed with respect to the seat bracket with the thigh support moving relative to the trim cover assembly.

BRIEF DESCRIPTION OF THE DRAWINGS

FIG. 5A is a bottom view of the trim cover assembly used in the thigh extender assembly;

FIG. 5B is a top view of the trim cover assembly used in the thigh extender assembly;

FIG. 5C is a cross section of the trim cover assembly used in the thigh extender assembly.

DETAILED DESCRIPTION

As required, detailed embodiments of the present disclosure are disclosed herein. However, it is to be understood that the disclosed embodiments are merely exemplary of the disclosure that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present disclosure.

Figure 1:
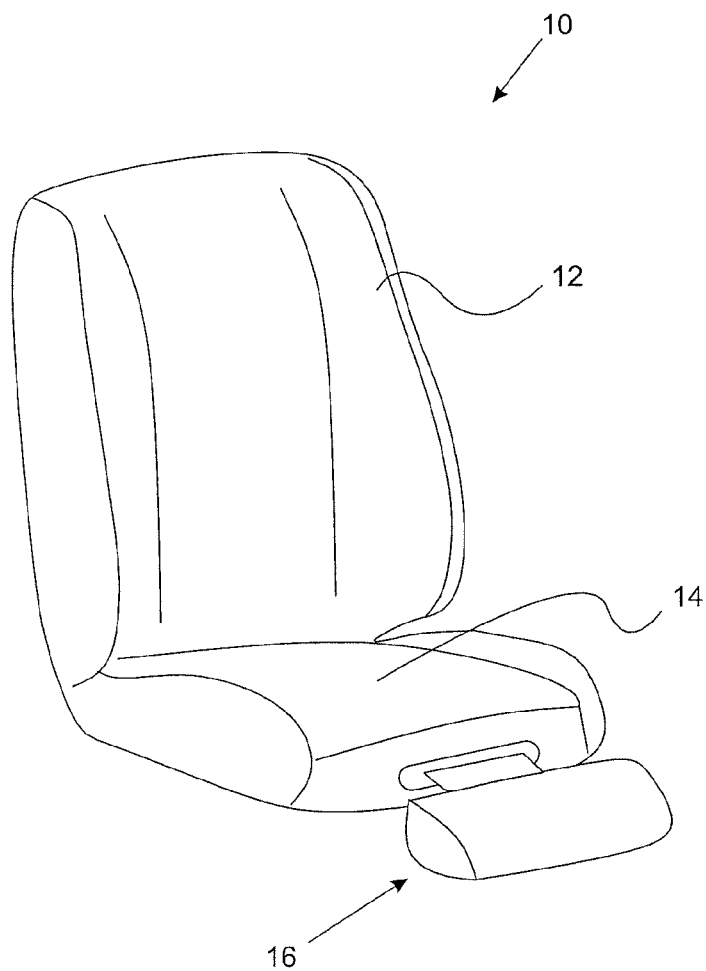
FIG. 1 is a perspective view of a vehicle seat having a thigh extender assembly.
Figure 2:
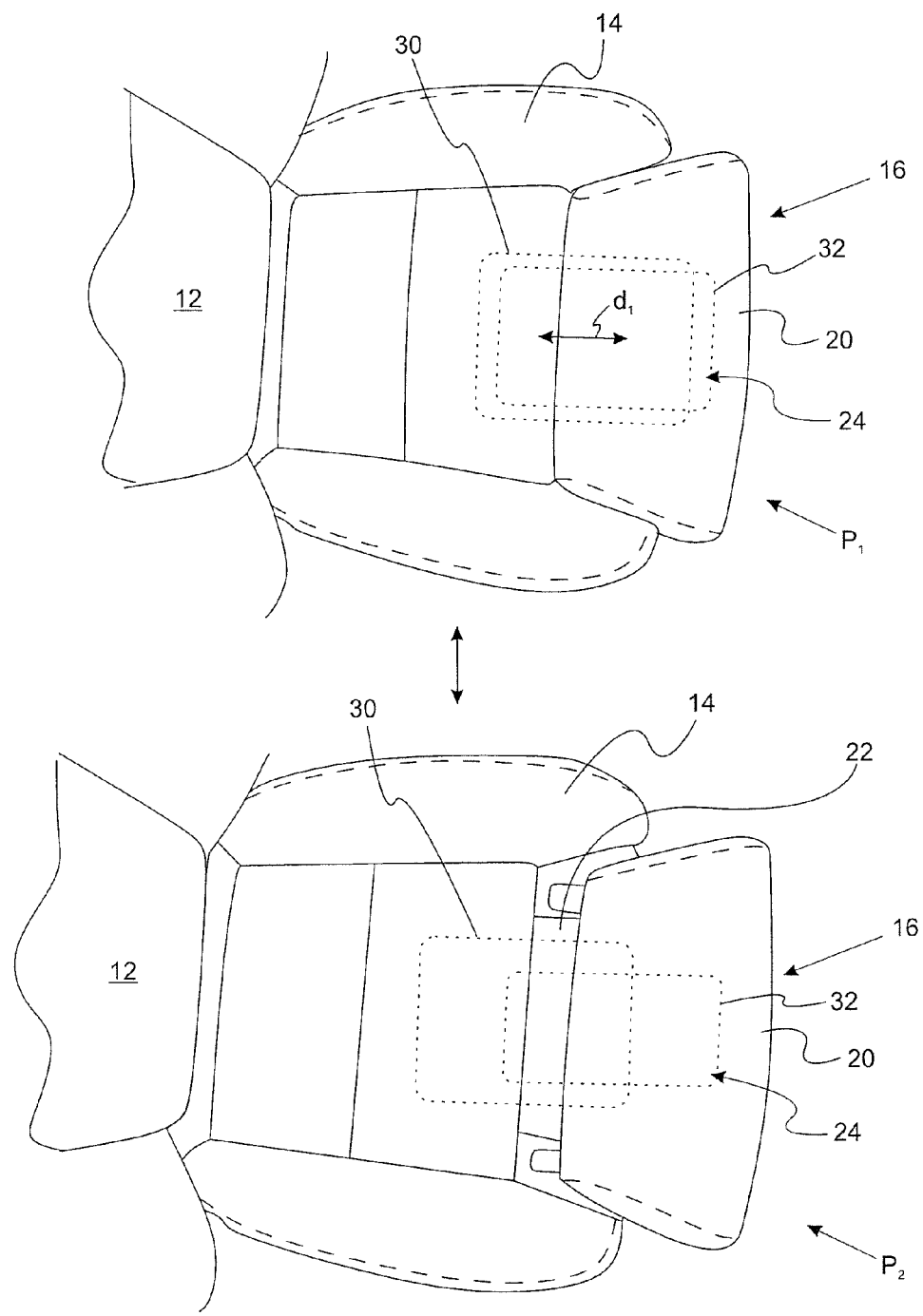
FIG. 2 is a top view of a vehicle seat having a thigh extender assembly showing the thigh extender assembly in the retracted and extended positions.

With reference to FIGS. 1 and 2, schematics of a vehicle seat with a thigh extender are provided. FIG. 1 is a perspective view of a vehicle seat while FIG. 2 is a top view of the vehicle seat. Vehicle seat 10 includes seat back 12, seat bottom 14, and thigh extender assembly 16. Thigh extender assembly 16 includes a thigh support 20, trim cover assembly 22, and an extension bracket assembly 24. Thigh support 20 is moveable between retracted position $P_1$ and an extended position $P_2$. Extension bracket assembly 24 is attached to the seat bottom 14. Extension bracket assembly 24 includes seat bracket 30 and an extension bracket 32. Extension bracket 32 is moveable relative to the seat bracket. Trim cover assembly 22 is disposed over the extension bracket assembly such that when the thigh support moves between the retracted position and the extended position along direction $d_1$, the extension bracket assembly 24 is concealed with thigh support 20 and trim cover assembly 22, with thigh support 20 moving in unison with extension bracket 32.

Figure 3:
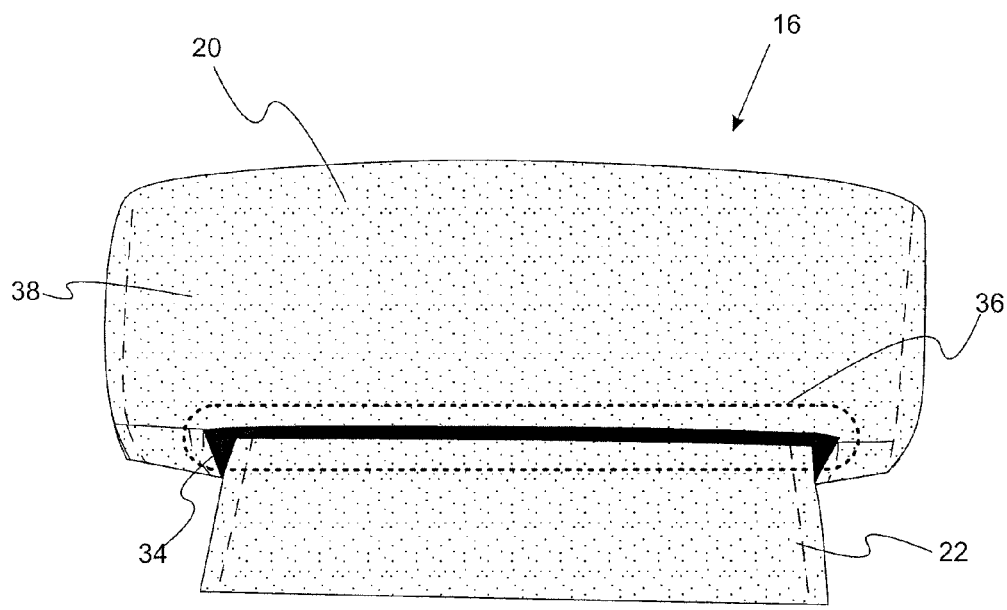
FIG. 3 is a perspective view of a thigh extender assembly.
Figure 6:
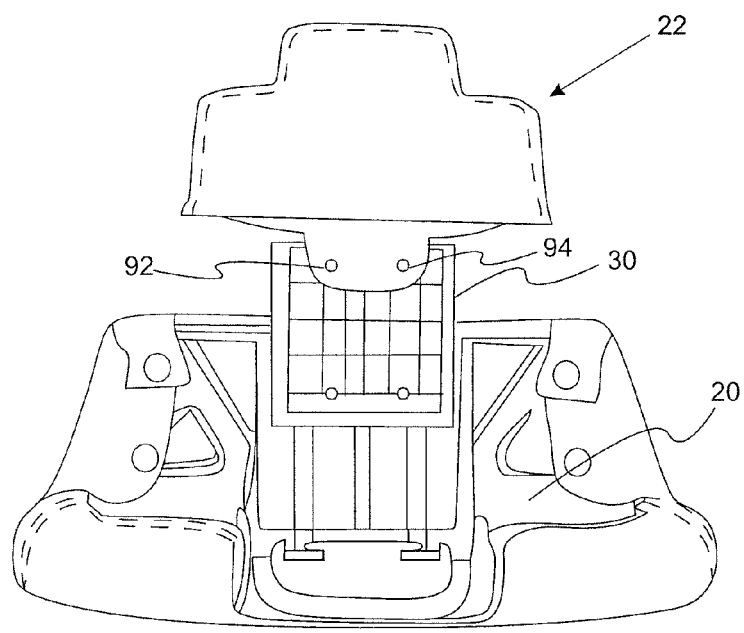
FIG. 6 is bottom view of the trim cover assembly partially attached to the thigh extender.

With reference to FIG. 3, a perspective view of thigh extender assembly 16 is provided. In this variation, thigh support 20 defines opening 34 for receiving at least a portion of the trim cover assembly 22 when the thigh extender assembly is in the retracted position. As thigh extender assembly 16 is moved to the extended position, thigh support 20 moves relative to trim cover assembly 22 with extension bracket assembly 24 being concealed from above by the trim cover assembly. Typically, thigh support 20 includes bun 36 disposed over thigh support frame member 38. In a refinement, bun 36 includes foam covered with a trim cover. In a further refinement, opening 34 allows trim cover assembly 22 to slide over support member 20.

Figure 4A:
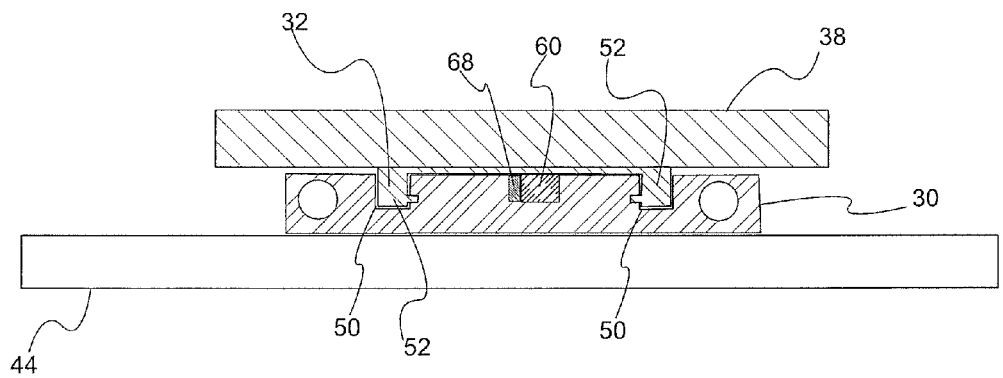
FIG. 4A is a cross section of the extension bracket assembly used in the thigh extender assembly.
Figure 4B:
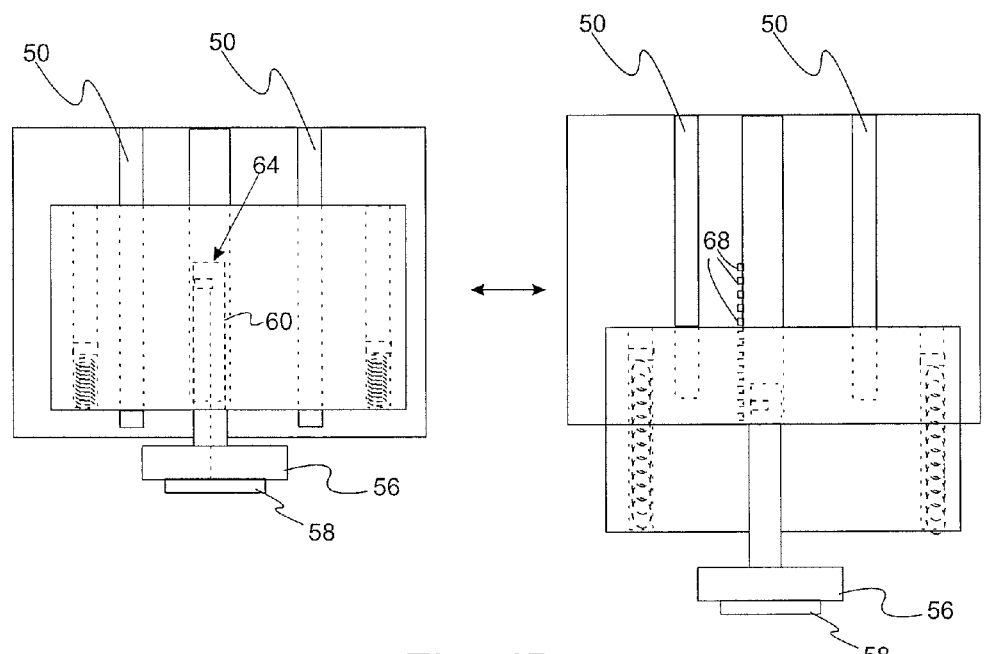
FIG. 4B is a top view of the extension bracket assembly showing movement between the retracted and extended positions.

With reference to FIGS. 4A and 4B, schematic illustrations of bracket assembly 24 are provided. FIG. 4A is a cross section of the extension bracket assembly. FIG. 4B is a top view of the extension bracket assembly showing movement between the retracted and extended positions. Extension bracket assembly 24 includes seat bracket 30 and an extension bracket 32. Seat bracket 30 attaches the thigh extender assembly to the seat bottom. In a refinement, seat bracket 30 is attached to seat bottom frame element 44 and extension bracket 32 is attached to thigh support frame member 38. In another refinement, seat bracket 30 includes guide slots 50 and the extension bracket 32 includes guide tracks 52 that align to the guide slots. In still another refinement, extension bracket assembly 24 has user operated handle 56 with release 58. Handle 58 is attached to guide bar 60 which is fixed to extension bracket 32. Latching system 64 includes latching component 66 which is in communication with release 58. Latching component 66 contacts latching feature 68 holding extension bracket 32 in place relative to seat bracket 30 When a user operates release 58, latching component 66 is released allowing the user to move the thigh support.

With reference to FIGS. 5A, 5B, 5C, and 6, schematics of a variation of trim cover assembly 22 are provided. FIG. 5A is a bottom view of the trim cover assembly. FIG. 5B is a top view of the trim cover assembly. FIG. 5C is a cross section of the trim cover assembly. Trim cover assembly 22 includes support member 70 and trim cover 72. Examples of suitable materials from which trim cover 72 is formed include, but are not limited to, non-woven fabrics, woven fabrics, leather, plastic sheets, vinyl sheets, and combinations thereof. In general, support member 70 is formed from a sheet that is stiffer than trim cover 72 allowing the trim cover to be held in a planar manner or in any shape desired. Examples of suitable materials from which support member 70 is formed include, but are not limited to, plastic sheets, vinyl sheets, and combinations thereof. In a refinement, trim cover 72 is sewn to support member 70 with sew lines 74. As depicted, trim cover 72 includes flap sections 80, 82, 84, 86 that wrap around or are folded over sides of support member 70. Bottom flap 90 wraps around or is folded over both support member 70 and seat bracket 30. Openings 92, 94 allow the passage of bolting components to attach to seat bottom 14.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A vehicle seat comprising:
a seat back;
a seat bottom; and
a thigh extender assembly including:
   an extension bracket assembly attached to the seat bottom, the extension bracket assembly including a seat bracket and an extension bracket, the extension bracket being moveable relative to the seat bracket;
   a thigh support attached to an end of the extension bracket such that the thigh support is moveable between a retracted position and an extended position; and
   a trim cover assembly disposed over the extension bracket assembly such that when the thigh support moves between the retracted position and the extended position the extension bracket assembly is concealed with the trim cover assembly being held fixed with respect to the seat bracket with the thigh support moving relative to the trim cover assembly, the trim cover assembly including a support member and a trim cover, wherein the trim cover is folded over a first side and a second side of the support member.

2. The vehicle seat of claim 1 further comprising a latching system for holding the thigh support at position relative to the seat bottom.

3. The vehicle seat of claim 1 wherein the trim cover includes a component selected from the group consisting of non-woven fabrics, woven fabrics, leather, plastic sheets, vinyl sheets, and combinations thereof.

4. The vehicle seat of claim 1 wherein the support member includes a component selected from the group consisting of plastic sheets, vinyl sheets, and combinations thereof.

5. The vehicle seat of claim 1 wherein the support member is stiffer than the trim cover allowing the trim cover to be held in a planar manner.

6. The vehicle seat of claim 1 wherein the trim cover is folded over an end of the support member.

7. The vehicle seat of claim 6 wherein the trim cover is sewn to the support member.

8. The vehicle seat of claim 1 wherein the thigh support defines an opening for receiving at least a portion of the trim cover assembly when the thigh extender assembly is in the retracted position.

9. The vehicle seat of claim 1 wherein the seat bracket includes a guide track and the extension bracket includes receiving slots that align to the guide track.

10. A thigh extender assembly for a vehicle seat, the thigh extender assembly comprising:
an extension bracket assembly attachable to a vehicle seat bottom, the extension bracket assembly including a seat bracket and an extension bracket, the extension bracket being moveable relative to the seat bracket;
a thigh support attached to an end of the extension bracket such that the thigh support is moveable between a retracted position and an extended position; and
a trim cover assembly disposed over the extension bracket assembly such that when the thigh support moves between the retracted position and the extended position the extension bracket assembly is concealed with the trim cover assembly being held fixed with respect to the seat bracket and the thigh support moving relative to the trim cover assembly, the trim cover assembly includes a support member and a trim cover, wherein the trim cover is folded over a first side and a second side of the support member.

11. The thigh extender assembly of claim 10 further comprising a latching system for holding the thigh support at position relative to the seat bottom.

12. The thigh extender assembly of claim 10 wherein the trim cover includes a component selected from the group consisting of non-woven fabrics, woven fabrics, leather, plastic sheets, vinyl sheets, and combinations thereof.

13. The thigh extender assembly of claim 10 wherein the support member includes a component selected from the group consisting of plastic sheets, vinyl sheets, and combinations thereof.

14. The thigh extender assembly of claim 10 wherein the support member is stiffer than the trim cover allowing the trim cover to be held in a planar manner.

15. The thigh extender assembly of claim 10 wherein the thigh support defines an opening for receiving at least a portion of the trim cover assembly when the thigh extender assembly is in the retracted position.

16. The thigh extender assembly of claim 10 wherein the seat bracket includes a guide track and the extension bracket includes receiving slots that align to the guide track.

* * * * *